United States Patent
Parker

(10) Patent No.: US 7,118,673 B2
(45) Date of Patent: Oct. 10, 2006

(54) FILTER FOR OIL CONTAINING ADHESIVE CONTAMINANTS

(75) Inventor: Steven C. Parker, Rancho Santa Margarita, CA (US)

(73) Assignee: HTI Filtration Corporation, Stanton, CA (US)

( * ) Notice: Subject to any disclaimer, the term of this patent is extended or adjusted under 35 U.S.C. 154(b) by 384 days.

(21) Appl. No.: 10/480,182

(22) PCT Filed: Jul. 17, 2002

(86) PCT No.: PCT/US02/22679

§ 371 (c)(1),
(2), (4) Date: Dec. 8, 2003

(87) PCT Pub. No.: WO03/008063

PCT Pub. Date: Jan. 30, 2003

(65) Prior Publication Data

US 2004/0206684 A1    Oct. 21, 2004

Related U.S. Application Data

(60) Provisional application No. 60/306,198, filed on Jul. 17, 2001.

(51) Int. Cl.
*B01D 29/07* (2006.01)
*B01D 27/04* (2006.01)
*B01D 27/06* (2006.01)
*B01D 27/07* (2006.01)
*B01D 27/00* (2006.01)

(52) U.S. Cl. .................. 210/323.2; 210/335; 210/338; 210/437; 210/440; 210/446; 210/450; 210/493.1; 210/497.01

(58) Field of Classification Search ............. 210/323.2, 210/335, 338, 437, 440, 446, 450, 493.1, 210/497.01
See application file for complete search history.

(56) References Cited

U.S. PATENT DOCUMENTS

| 4,366,057 A | * | 12/1982 | Bridges et al. | 210/437 |
| 4,773,999 A | * | 9/1988 | Schade | 210/315 |
| 4,886,599 A | * | 12/1989 | Bachmann et al. | 210/287 |

* cited by examiner

Primary Examiner—Krishnan S. Menon
(74) Attorney, Agent, or Firm—Christie, Parker & Hale, LLP

(57) ABSTRACT

The present invention involves a filter element assembly (10), which is useful in removing undissolved adhesive bodies from oil. The assembly includes at least one cylindrical body 11 of principal filter medium for removing particulates from oil. Body 11 has an inlet end and an outlet end. A secondary filter medium 20 for removing undissolved adhesive bodies from the oil is located around the sides and across the inlet end of the principle medium (11). A flow affording spacer 926) is disposed between the sides and the inlet end of the principal medium (11). A preferred spacer (26) is a non-woven expandable mesh present in a partially expanded state and having elements (27,28) grouped in first and second sets in which the elements (27) in the first set are laid atop the elements (28) in the second set. A readily cleanable containment vessel (39) for the filter element assembly (10) includes a tubular body (41) which is releasably connectible in liquid tight relation to a bottom cover (44) for the body (41).

21 Claims, 3 Drawing Sheets

FILTER FOR OIL CONTAINING ADHESIVE CONTAMINANTS

CROSS-REFERENCE TO RELATED APPLICATION

This application is a 371 of PCT/US02/22679, Jul. 17, 2002, claims the priority of U.S. provisional patent application No. 60/306,198 filed Jul. 17, 2001.

FIELD OF THE INVENTION

This invention pertains to oil filters. More particularly it pertains to oil filters having a fabric covering which acts as a supplemental filter medium which is usefill where oil contains undisolved amounts of glue such as a water soluble glue.

BACKGROUND OF THE INVENTION

The conditions presenting the need for this invention and for its development were discerned in the food processing industry. More particularly, those conditions were discerned in the context of machines used in breweries to apply paper-based labels and the like to filled bottles and the like. Depending upon the functions which they serve, the machines used to package beverages or foods can be subject to governmental regulations concerning cleanliness and are cleaned from time to time. The cleaning process typically includes spraying the machinery parts with water, containing a detergent, at high temperature (e.g., 150–160° F.) and pressure at 150 pounds psi, more or less. Under those circumstances, water enters into the gear boxes and other lubricated components of the machinery. Those machines have lubricating systems in which the normally clear lubricating oil is filtered and recycled.

Machines used to apply paper labels to filled beer bottles are called rotary labelers. Labelers typically include two stations called aggregates at which labels can be applied to a bottle. At each station there is a principle glue application roller to which a glue is applied. Glue is applied from that roller to the reverse side of a label via a transfer roller before the label is placed into contact with the bottle. The principle glue application and glue transfer rollers have vertical axes. The glue which typically is used is a non-Newtonian liquid which is substantially thixotropic in nature. The glue flows downwardly along the roller across the lower end of the roller and then down the roller's supporting shaft. The glue, because of its nature, passes through the seals associated with the roller shafts and thereby enters into the lubricated gear boxes of the labeling machines. The amount of glue which can enter into a given gear box can vary from small to very substantial, depending upon the tolerances of the machinery, its age, and particularly the condition of any seals which may be present on the roller drive shafts. The amount of glue present in a labeler gear box can be so great that when the labeler is shut down for a period, the glue can set adequately to prevent the machine from being restarted. It is apparent, therefore, that there is a need for a filter capable of removing glue from the lubricating oil in labeling machines used in the food processing industry, as well as in other labeling machines and in other contexts.

As noted above, machines used in the food processing industry are required to be maintained at specified cleanliness levels to prevent contamination of the food products. When those machines are periodically washed down as described above, water can also enter into the lubricating oil through the same seals through which the glue enters. When water is present in oil containing water soluble glue of the kind used in labelers in the food processing industry, the water dissolves the glue and causes the glue's adhesive to separate from a binder in the glue. The binder typically is talc or some other fine mineral powder present in the glue as a volumetric extender. Binder particles act as an abrasive to the lubricated machinery.

SUMMARY OF THE INVENTION

This invention provides an oil filter which has novel and effective features which cause the filter to be particularly useful in the filtering of wet (i.e. water containing) oil which also includes an adhesive such as a water soluble glue used in labeling machines in the food processing and packaging industries. The glue can be present in the oil as globules of glue; if the oil contains water, the glue can be present in the oil as globules and in solution in the water. Substantial aspects of the filter can be and preferably are consistent with the descriptions and illustrations found in U.S. Pat. No. 4,366,057. In such a filter, the filter medium is an annular body defined by winding on a tubular core many turns of a tissue-like paper or other fibrous tissue-like material, with or without creping, to define a body of filter medium of selected depth radially outwardly from the core. Such a filter is an axial flow filter in which the liquid to be filtered enters an end of the filter medium body and flows between the individual turns of the filter material toward an inlet which can be either at the opposite end of the body or intermediate its length; in the latter instance, the liquid to be filtered enters the body of filter medium at the opposite ends of the body. U.S. Pat. No. 4,366,057 teaches that it is beneficial to relatively tightly surround the annular body of tissue-like filter medium by a liquid impermeable membrane adjacent those portions of the annular medium body where filtered liquid exits from the body. That patent also teaches that, to protect the filter material during handling of the filter, it is desirable to encase the filter in a sock or the like which preferably is a fabric material.

Generally speaking, this invention provides a filter element useful for removing particulate matter from a filterable liquid also containing undissolved adhesive. The filter element comprises a body of principle filter medium defined to remove particulates from liquid flowing in a selected direction through that body. A secondary filter medium upstream of the principle filter medium is defined to remove undissolved adhesive from liquid flowing therethrough. The filter element also includes flow affording spacer means separating the principle and secondary filter media.

In the context of an axial flow oil filter, the practice of this invention interposes between the annular body of filter material and the encasing protective sock a layer of mesh, preferably a plastic mesh, as a flow affording spacer which extends circumferentially of the annular medium body and across its ends. In such a filter, the encasing sock becomes a supplemental filter medium which functions to separate glue from the liquid before the liquid enters the annular body of the principle filter media. The mesh appears to function as a mechanism for assuring the presence of liquid flow passages inside the sock along the exterior of that annular body and to its ends where the liquid can enter into and flow axially through the principle filter medium.

This invention also provides an improved containment vessel for a filter element of the kind described above.

DESCRIPTION OF THE DRAWINGS

Presently preferred and other embodiments of the invention are set forth in the description which follows. That description is presented with reference to the accompanying drawings in which.

DESCRIPTION OF THE PREFERRED EMBODIMENT

Figure 1:
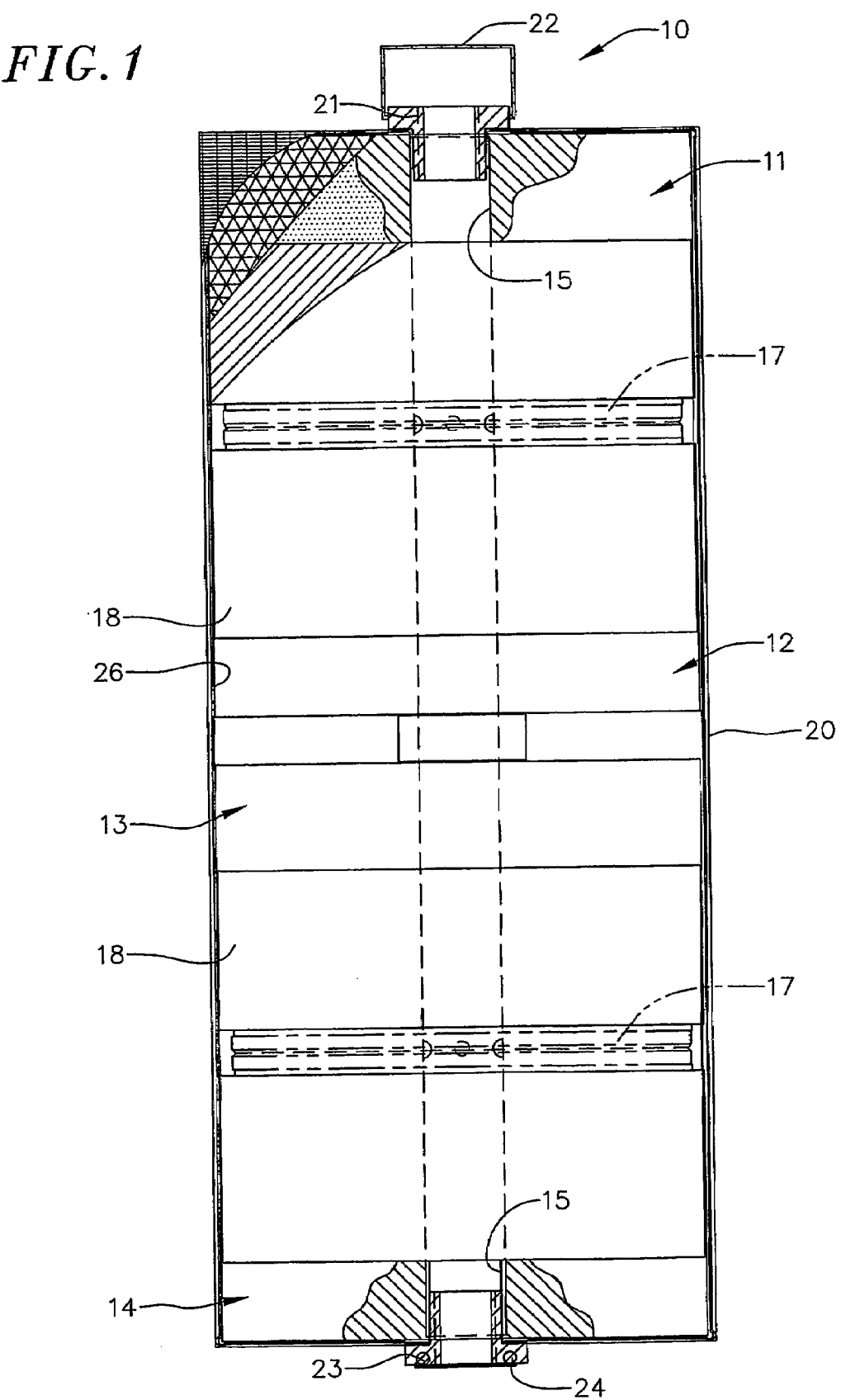
FIG. 1 is an elevation view, partially in cross-section, of a quadruple element axial flow filter unit according to this invention.

A presently preferred filter assembly 10 according to this invention is shown in FIG. 1. The filter assembly can have a nominal length of 14.75 inches (37.47 cm) and a nominal diameter of 5 inches (12.7 cm). Assembly 10 is a quadruple element axial flow filter composed of 4 separate principle filter elements 11–14. Each of filter elements 11–14 can be defined by multiple turns of a fibrous tissue-like material, in creped or uncreped form, wound multiple times about a central open-ended tubular core 15 of the assembly. The core can be defined by a cardboard tube or the like, such as a tube having a nominal diameter of 1.5 inch (3.81 cm). In the presently preferred filter assembly, each of the filter elements is wound to have a 5 inch (12.7 cm) outer diameter. The wound annular bodies of tissue-like material form the principle filter media of assembly 10.

Filter elements 11 and 12 and filter elements 13 and 14, respectively, cooperate as two pairs of filter media bodies having separate inlets at the upper and lower end of each pair and outlets at their opposing end faces in association with an outlet fitting 17 interposed between the elements of each pair. The outlet fitting can be in accord with the illustrations of FIGS. 2 and 2A of U.S. Pat. No. 4,366,057 and the related descriptions of that patent. The outlet fittings separate but yet cooperate intimately with the opposing outlet end faces of filter elements 11 and 12, for example, and also provide passages for the flow of filtrate entering the fitting toward and into core 15 of assembly 10. The filtrate exits assembly 10 through one end of core 15.

Also as described in U.S. Pat. No. 4,366,057, each pair of filter elements has wrapped around it, centrally of the length of the pair, a liquid impermeable membrane 18 which forms a sealing boot around the pair of elements for the reasons set forth in that patent. A porous sock 20, preferably made of woven or knitted fabric, surrounds the cylindrical exterior of the filter units and also the upper and lower faces of the top and bottom elements 11 and 14. The sock preferably extends into the interior of core 15 at the ends of the assembly and is there held in place by an annular flanged end fitting 21,23 which preferably is force fit into the respective end of core 15 to mechanically hold the sock in place around the filter elements. Upper end fitting 21 can include a lifting bail 22 movably coupled to the fitting in the manner of a bail or handle on a common bucket or pail. Lower end fitting 23 preferably includes a downwardly facing O-ring 24 which protrudes slightly below the lower face of that fitting about the entire extent of the central bore of the fitting.

The use of a fabric sock as a protective covering around filter elements of the kind described above is illustrated and described in U.S. Pat. No. 4,366,057. In the patent, the sock is said to function only as a protector for the wound tissue filter elements. A presently preferred material for use as sock 20 can be obtained from Zens Hosiery Manufacturing, Milwaukee, Wis. 53212-05041 as that firm's product R160-14KP 12.5/RO. That product is a woven cotton material which is provided as a flat knit fabric tube which is ribbed along the length of the tube. The flat knit tube has a width of about 4 3/16 inches. That is, that tube has an unstressed circumference of 8 3/8 inches (21.28 cm).

In marked difference from a filter according to the illustrations and descriptions of U.S. Pat. No. 4,366,057, filter assembly 10 includes a preferably foraminous spacer in the form of a layer of mesh material 26 interposed between sock 20 around the cylindrical exterior of the several filter elements and across the opposite ends of the uppermost and lowermost elements 11 and 14. That is, the mesh layer is present inside the sock along the cylindrical extent of the filter assembly and at its upper and lower ends to physically separate the sock from the other components of the filter assembly inside the sock. The mesh material preferably extends to but not into central core 15 of the filter assembly and may be present under the flanges of the filter assembly end fittings 21 and 23. Mesh material 26 is the presently preferred material used in filter assembly 10 as a flow affording spacer between the principle filter width (elements 11–14) and a secondary filter medium now provided by sock 20 as described below. In the absence of a flow affording space between the sock and elements 11–14, the sock provides no significant filtration function in the context of this invention.

Figure 3:
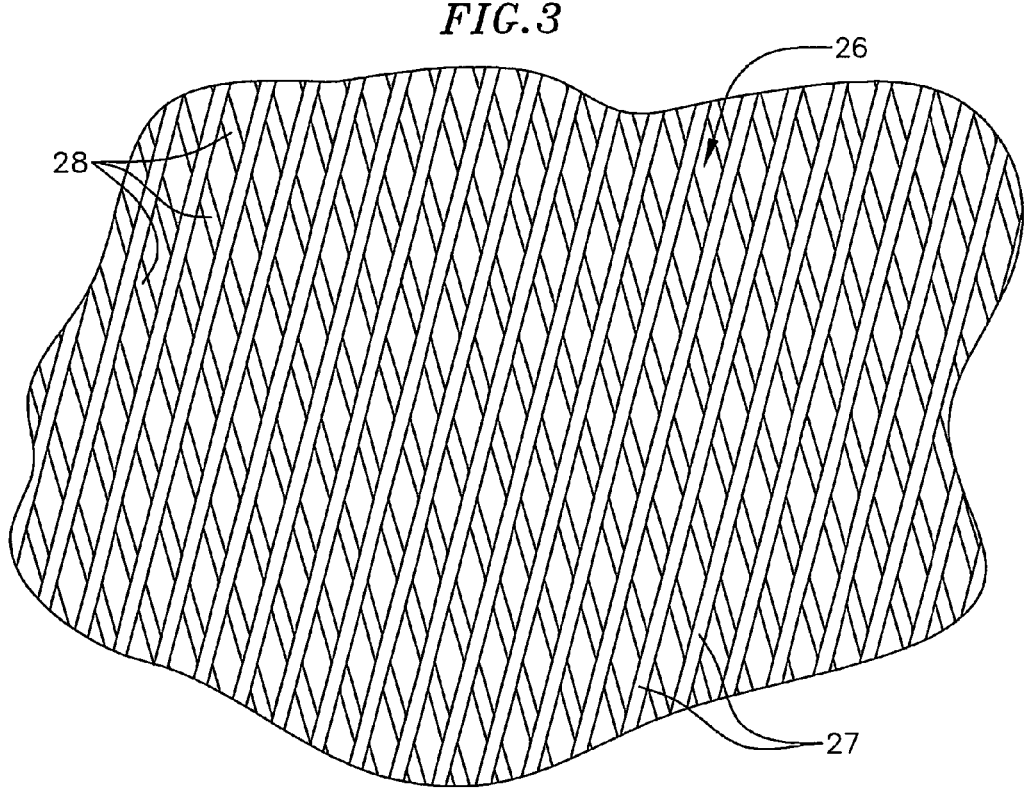
FIG. 3 is a fragmentary plan view of a preferred form of spacer material in the filter element shown in FIG. 1.
Figure 4:
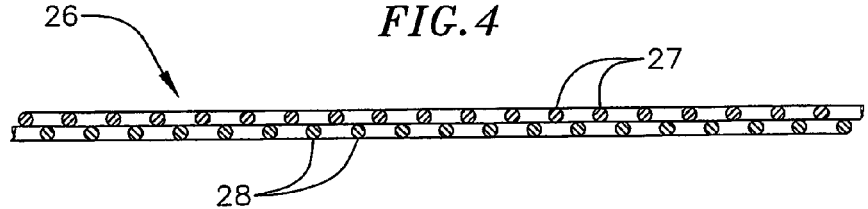
FIG. 4 is an end view of the spacer material shown in FIG. 3.

A presently preferred material for use in defining mesh layer 26 is obtainable as Net Guard NG 8080 from Internet, Incorporated, Minneapolis, Minn. 55428. Its manufacturer promotes the product as one designed for protecting cylindrical parts from damage during shipping and handling, and it is advertised as having a use with products in a diameter range from 7 inches (17.78 cm) to 8.75 inches (22.23 cm). The product is extruded low density polyethylene. It is made in tubular form and is composed of a first set of spaced plastic strands 27 which spiral helically in a right hand manner around the tube and a second set of spaced strands 28 which spiral in a left hand manner around the tubular product; see FIG. 3. One set of the strands is laid over the other set. Thus, as shown in FIG. 4, stands 27 lie in a first plane in the mesh and strands 28 lie in a separate, adjacent parallel plane. The mesh is not a woven mesh. The product has a thickness of approximately 1.6 mm comprised of overlapping 0.8 mm polyethylene strands laid at approximately a 30° angle relative to each other, thereby creating a product having laterally expandable, diamond-shaped openings approximately 8 mm wide by 20 mm long in the at-rest or unstressed state of that product. In its flat state, the tubular mesh material appears as a flat strip having a width of 8.75 inches (22.23 cm). In view of the information set forth above, it will be apparent that when the mesh material is stretched as shown in FIG. 1 around the axially aligned set of filter elements 11–14 (each of which has a 5 inch [12.7 cm] diameter) and also around the exterior of the sealing boot 18 associated with each pair of filter elements, the tubular mesh material will be expanded by approximately 80%; that is a partially expanded condition of the mesh. That is, the filter elements have a circumference of 15.708 inches (39.90 cm) as compared to an unstressed effective 8.75 inch (22.23 cm) circumference of the mesh tube. The presence of the mesh material around the exterior of the filter elements, results in a construction having a diameter of approximately 15 1/16 inches (40.06 cm). When the fabric sock is put in place around the mesh-encased filter elements, the circumferential expansion of the sock tubing material is approximately 88% of its unexpanded circumference.

A four element filter assembly as described above, but having no mesh material inside the fabric sock (i.e. a filter assembly entirely consistent with the descriptions of U.S. Pat. No. 4,366,057) was tested under laboratory conditions with oil having particles and globules of water soluble glue in the oil. It was found that 250–300 ml of glue dissolved in circulating oil would kill the filter. That is, the presence in circulating oil of that amount of the kind of glue used in brewery labeling machines caused the inlet ends of the elements of the assembly to seal off so that no further liquid could be introduced into the elements at acceptably low pressure levels. A subsequent test was made on a filter assembly in which the sock was removed but replaced by mesh material of the kind described above. The presence of the plastic mesh material in place of the fabric sock material had no effect on the performance of the filter assembly. The same quantity of glue dispersed as particles and globules in circulating oil effectively killed the filter when operated at the same pressure levels. However, when the plastic mesh material was retained inside the fabric sock consistent with the descriptions above and the illustrations of FIG. 1, laboratory tests showed that between 700–1,000 ml of glue in particulate, globular and dissolved form could be removed from wet oil before the filter effectively shut off at its ends when operated at the same inlet pressures as used in the other tests.

When a filter assembly having a fabric sock, but no mesh inner liner (spacer) inside the sock, was tested, it was found that glue particles built up very predominantly at the ends of the filter assembly and around its mid-length, i.e., at the places where oil enters into the individual filter elements. However, when a filter assembly including the mesh layer as an inner liner inside the sock is present in the filter assembly, the distribution of glue particles on the sock material is relatively uniformly along the sides and ends of the filter assembly. In that situation, the sock material ceases to function merely as a protective thing for the wound tissue elements, but becomes a supplemental or secondary filter medium which is effective to remove undissolved adhesive present in the oil. Undissolved adhesive can be present in the oil in a range from small particles to rather large clumps or blobs. The preferably nonwoven mesh material inside the fabric sock is perceived to afford flow passages along the sides and across the ends of the filter elements inside the sock, thereby assuring that liquid passing through the sock at any location on the filter assembly can flow to the inlet end of one of the filter elements and so enter the wound tissue principle medium of the filter assembly. The principle medium then is able to perform its intended function to remove particulates, water, and substances dissolved in that water from the liquid entering it.

It is believed that there is a cooperative relationship between the thickness of the mesh material, the size of the openings provided in the mesh material, and the nature of the surrounding sock material. Bulkiness of the sock material is desired. If the sock material is too sheer, the pressure of the fluid in the containment vessel for the filter assembly outside the filter element can act upon the sock material to deflect it into the mesh openings and effectively restrict the flow passages provided by the mesh material. The bulkier the sock material, the larger the mesh material openings can be. Therefore, the thickness of the yarn used to define the sock material and the way that yarn is woven to define ribs of different width and depth have an effect upon the performance of the filter assembly. Similarly, the tightness of the sock material around the filter elements also has an effect. If the sock material is too slack as applied to the filter elements, the sock material tends to fill the mesh openings more readily.

It has also been found that a given filter assembly according to this invention has a finite capacity for removing contaminants, water and/or particulates, from liquid presented to the filter assembly. For the filter assembly described in detail above, it appears that the capacity of the filter assembly is about 1 liter.

Filters of the kind described above perform best at comparatively low pressure differentials across them. At the commencement of the tests described above, the pressure drop across the filter assembly was 15 psi. When the pressure drop across the filter reached 55 psi, it was considered that the filter assembly needed to be replaced. 1.0 psi equals 0.0703 kg/cm$^2$.

Wound tissue axial flow filters of the kind described are known to change diameter in use of the filters. They swell or expand at their inlet ends as they absorb water from liquid entering the wound tissue bodies. Also, over time, as the pressure differential between liquid in the containment vessel outside the filter and the pressure in the tissue bodies at and adjacent to the outlet fittings 17 increases, the tissue bodies at and adjacent their outlet ends contract or reduce in diameter. Each tissue body becomes more or less tapered. Expandible mesh 27, used as a spacer between the principle and secondary filter media, is able to follow and conform to those changes in tissue body diameter. The spacer functional efficiency is unaffected by those changes in the shape of the wound tissue bodies.

As noted above, the function of the spacer between the principle and secondary filter media is to separate the secondary media from direct contact with the principle filter media and to afford flow paths for liquid emerging from the secondary media along the sides and across the inlet ends of the principle media bodies. Those functions can be performed by forms of spacer material other than mesh 27. An example of an alternate form of spacer material is shown in FIG. 5.

Figure 5:
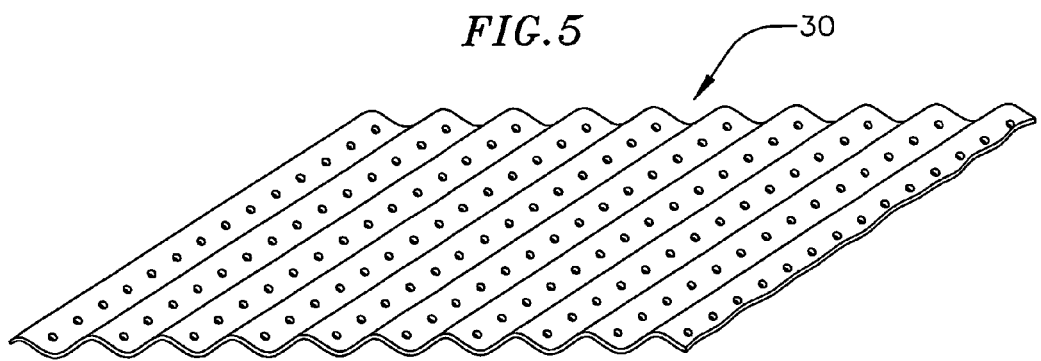
FIG. 5 is a fragmentary perspective view of another form of spacer material.

FIG. 5 shows a portion of a perforated and corrugated material 30. Material 30 can be made of a synthetic resin such as low density polyethylene so that it has a measure of inherent stiffness and structural integrity while also being deformable. By virtue of its corrugations, material 30 can follow changes in the shape of the principle media bodies while also providing the desired spacing of the secondary media from the principle media during use of the filter assembly. The perforations in material 30 enable liquid entering troughs or channels concave toward the secondary media to pass into the troughs or channels which are concave toward the principle filter media. Liquid can flow along both sets of troughs. Material 30 preferably is applied around the aligned principle media bodies so that the corrugations extend along the lengths of those bodies and, at the ends of the filter assembly, toward the central axis of the assembly.

Other materials may be found or developed to serve as effective flow affording spacers in filter assemblies according to this invention.

It is possible that the glue or adhesive present in liquid presented to filter assembly 10 may be soluble in a liquid form contaminant present in that principle liquid. In a presently preferred use of filter assembly 10, the principle liquid is oil and the adhesive is soluble in water. If water is present in the oil, as often is the case, some of the adhesive can be dissolved in that water. In that event, water and compounds in solution in it are removed from the oil by the principle media, along with particulates which can include fillers or extenders used in the adhesive.

Containment vessels for use with filters of the kind described in U.S. Pat. No. 4,366,057, as well as with other kinds of replaceable or cleanable filter assemblies, heretofore have been provided as two-part articles, namely, a cylindrical cannister body having permanently affixed to it a preferably dished bottom closure carrying inlet and/or outlet filtrate flow fittings, and a removable cover. The top of the cannister body and the cover have cooperating peripheral flanges between which a sealing O-ring or other gasket can be disposed. The cover is releasably connectable to the cannister body, as by an expansible circumferential clamp having an over-center toggle closure which, upon actuation, moves the cannister body and cover flanges toward each other to compress the O-ring or other gasket and thereby seal the filter assembly container.

Containers for filter assemblies according to U.S. Pat. No. 4,366,057 have a central filtrate outlet flow fitting in the center of the container bottom and an inlet flow fitting in the container bottom to the side of the outlet fitting. Also, covers for existing containers for filter assemblies according to that patent may carry a gauge fitting at their centers to receive a pressure gauge for indicating the pressure of filtrate in the central core of the filter assembly in use. When the cover of the existing container is coupled to the container body in the manner described above, the lower end of the gauge fitting fits snugly into the upper end fitting of the filter assembly to center the upper end of the filter assembly in its container. The O-ring carried by the filter assembly's bottom end fitting bears forcibly upon the upper end of the container outlet fitting.

Figure 2:
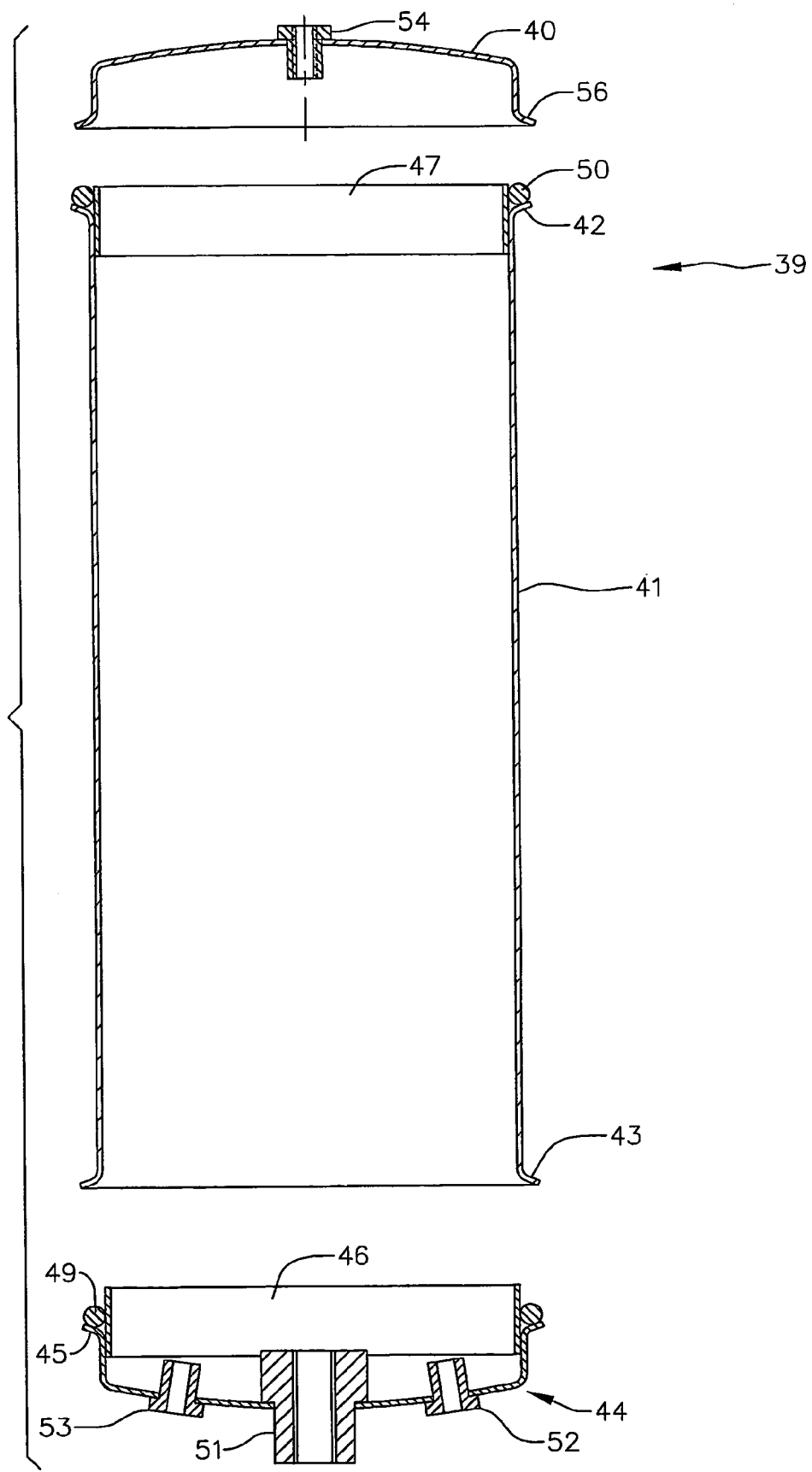
FIG. 2 is an exploded cross-sectional elevation view of an improved containment vessel for the filter element shown in FIG. 1.

It has been found that existing containers provided for use with filter assemblies of the kind described in U.S. Pat. No. 4,366,057, e.g., present problems when such containers are used with a filter assembly according to this invention. The problem is that the glue separated from the oil by the improved filter assembly is not all carried on or retained by the sock material of filter assembly 10 as it is separated from the oil. Substantial quantities of that glue can accumulate in the bottom of the containment vessel. The depth and comparatively small diameter of existing containment vessels make it very difficult to remove that glue from the lower end of the containment vessel at the time it is necessary to exchange a spent filter assembly for a fresh one. Accordingly, this invention also provides an improved filter assembly containment vessel 39 as shown in FIG. 2. That containment vessel is readily cleanable. It is provided in three principle parts composed of a top cover 40 which can be like the cover of an existing containment vessel with an outward circumferential end flange 56, and a tubular body 41 having an upwardly and outwardly flared upper ends defining a sloping circumferential top flange 42 and a similar outwardly and downwardly sloping bottom flange 43. The third principle component of the improved containment vessel is a bottom cover assembly 44. The bottom cover is an upwardly open, relatively shallowly dished article having an upwardly and outwardly sloping flange 45 at its upper end; the cylindrical walls of the bottom cover carry, on the inside of the cover walls, a short cylindrical guide sleeve 46 which extends a short distance above flange 45 to fit into the lower end of tubular body 41 upon assembly of the container. A similar guide sleeve 47 can be secured to the upper inner walls of the body 41 to extend above flange 42 and into the interior of cover 40 when cover 40 is mated to the body. The bottom cover flange 45 carries a sealing O-ring 49 on its upper surface in engagement with the exterior of sleeve 46. An upper sealing O-ring 50 is carried on the upper surfaces of the body's top flange 42 in association with the exterior of sleeve 47. The bottom cover carries a central outlet fitting 51 and an inlet fitting 52 to the side of the outlet fitting. A drain fitting 53 can be provided and is preferred. An expansible encircling clamp mechanism, similar to that used to secure cover 40 to the top of body 41, can be used to secure the lower end of body 41 to bottom cover 44 and to compress O-ring 49 to seal that connection of the filter assembly container. The volume inside bottom cover 44 below the upper edge of sleeve 46 is sufficient to serve as a reservoir and container for at least one liter of material in combination with a filter assembly having the dimensions and characteristics described above. A gauge fitting 54 can be mounted in the center of top cover 40 to extend into its interior.

The oil flow paths to and from containment vessel 39 are separately valved by valves not shown. The three piece container is assembled by first coupling body 41 to bottom cover 44 which typically is fixed in place by the piping to and from the container. A fresh filter assembly is then inserted into the partially assembled containment vessel so that the O-ring 24 at the bottom end of the filter assembly bears upon the upper end of container outlet fitting. Cover 40 is then mated to container body 41 and secured to it in a manner which compresses O-ring 50 and O-ring 24 at the lower end of filter assembly 10. As installed upon the container body the gauge fitting 54 carried in the center of cover 40 extends snugly into the filter assembly's upper end fitting 21. As oil is first introduced into the assembled container, air present in the container can be vented from the container in a known manner; the assembled container and the filter assembly in it then are ready for use to filter oil containing glue and water.

The presently preferred principle filter medium in the filter assembly according to this invention is the wound tissue filter medium described above. Other forms of principle filter medium may be used in combination with an encasing flow affording spacer material between the principle medium and an outer secondary filter medium.

What is claimed:

1. A filter element useful for removing particulate matter from a filterable liquid also containing undissolved adhesive, the element comprising a body of first particulate-removing filter medium which has length between opposite liquid inlet and outlet ends, a foraminous spacer structure disposed around at least a portion of the length of the body of first medium and across the inlet end of the body, the spacer structure being defined for liquid flow-through it and laterally along its extent, and a second filter medium defined to remove undissolved adhesive from liquid flowing therethrough, the second medium being disposed around the body of the first filter medium and across the inlet end thereof with the spacer structure interposed between the first medium and the second medium.

2. A filter element according to claim 1 wherein the second filter medium is a fabric.

3. A filter element according to claim 2 in which the fabric is a knitted fabric.

4. A filter element according to claim 3 in which the fabric is a ribbed knitted fabric.

5. A filter element according to claim 1 in which the spacer structure is a mesh.

6. A filter element according to claim 5 in which the mesh is a nonwoven mesh.

7. A filter element according to claim 5 in which the mesh is defined of first and second sets of spaced elements crossing each other and in which the elements are not in a common plane at all locations in the mesh.

8. A filter element according to claim 7 in which the mesh elements in the first set are disposed substantially in a first plane and the mesh elements in the second set are disposed substantially in a second plane.

9. A filter element according to claim 8 in which the mesh is expandable and the elements in the first and second sets have diameters of about 0.8 mm.

10. A filter element according to claim 8 in which the mesh is expandable and the elements in the first set are at an angle of about 30° relative to elements in the second set in an unexpanded state of the mesh.

11. A filter element according to claim 6 in which the material of the mesh is a synthetic material.

12. A filter element according to claim 6 in which the mesh is expandable and is in a partially expanded state as disposed around the first filter medium body.

13. A filter element according to claim 1 in which the spacer structure is a corrugated material.

14. A filter element according to claim 13 in which the corrugated material is perforated.

15. A filter element according to claim 1 in which the first filter medium is effective to remove water from oil.

16. A filter element according to claim 1 in which the first filter medium body comprises tissue sheet wound plural times about a central core and the first medium body operates as an axial flow filter as liquid moves from the inlet end of the body to the outlet end between the tissue layers.

17. A filter element according to any one of claims 1 through 16 including a second similar body of the first filter medium disposed substantially collinearly with the aforesaid body with the outlet ends of the bodies adjacent each other, and wherein the second filter medium and the spacer structure are disposed around both bodies and across their inlet ends.

18. A filter element according to any one of claims 1 through 15 further including second, third and fourth similar bodies of first filter medium, the first and second bodies and the third and fourth bodies comprising respective first and second pairs of bodies in which the bodies in each pair have their outlet ends proximately spaced from each other, all bodies of the first medium being elongate annular bodies coaxially arrayed on a central core member, the first and second pairs of the bodies being spaced a selected amount from each other along the core, and wherein the second filter medium and the spacer structure extend along and around the array of aligned first medium bodies and across the inlet ends of the bodies at the ends of the array.

19. A filter element assembly useful for removing particulate matter and undissolved adhesive material from a filterable liquid, the assembly comprising separate particulate and adhesive removing filters and a foraminous flow spacer disposed between them, the particulate removing filter comprising an elongate first body of first filter medium defined for flow of liquid axially therethrough from an inlet end to an outlet end, the body of first filter medium having an exterior surface extending between the said ends, the adhesive removing filter comprising a second body of different filter medium disposed proximately adjacent the inlet end and at least a portion of the first body's exterior surface which extends from that body's inlet end toward its outlet end, the spacer being present between the first and second filter media across the inlet end of the first body and over at least said portion of the exterior surface of the first body, the spacer affording flow of liquid emergent from the second body directly to the first body's inlet end and along said portion of the first body's exterior surface to its inlet end.

20. A method for removing particulate matter and undissolved adhesive from a filterable liquid comprising:

providing an axial flow filter defined to remove particulate matter from the liquid, the axial flow filter having length between opposite inlet and outlet ends, providing, around the axial flow filter along at least a portion of its length and across its inlet end, an adhesive-removing filter medium defined for liquid flow through it in a direction transverse to the lateral extent thereof, separating the adhesive-removing filter medium and the axial flow filter, along said filter and across its inlet end, by a spacer structure which affords liquid flow through it and laterally along its extent, and flowing adhesive-contaminated liquid first through the adhesive removing filter into the spacer structure, through and along the spacer structure to the inlet end of the axial flow filter, and through the axial flow filter.

21. A method for removing undissolved adhesive and particulate matter from a filterable liquid, comprising:

flowing the liquid through a first filter medium having a relatively large inlet flow area, the first medium being useful to remove the adhesive from the liquid, and introducing liquid emergent from the first medium into a second filter medium having a relatively small inlet area, the second medium being useful to remove finely divided particulate matter from the liquid, arranging the second filter medium as an axial flow filter having length between opposite inlet and outlet ends, disposing the first medium around the exterior and across the inlet end of the axial flow filter, and separating the first medium and the axial flow filter by a spacer structure which affords flow through it and laterally along its extent.

* * * * *